United States Patent [19]
Akagi

[11] Patent Number: 5,508,128
[45] Date of Patent: Apr. 16, 1996

[54] FUEL CELL SYSTEM AND FUEL CELLS THEREFOR

[75] Inventor: Kosuke Akagi, Osaka, Japan

[73] Assignee: Osaka Gas Co., Ltd., Osaka, Japan

[21] Appl. No.: 209,210

[22] Filed: Mar. 10, 1994

[30] Foreign Application Priority Data

Mar. 15, 1993 [JP] Japan ..................... 5-052817

[51] Int. Cl.⁶ ............................ H01M 8/18
[52] U.S. Cl. ................. 429/30; 429/32; 429/33; 429/34; 429/38; 429/39
[58] Field of Search ................. 429/30, 32, 33, 429/34, 38, 39

[56] References Cited

U.S. PATENT DOCUMENTS

| 4,857,420 | 8/1989 | Maricle et al. |
|---|---|---|
| 5,292,599 | 3/1994 | Soma et al. ............... 429/30 |

FOREIGN PATENT DOCUMENTS

| 0524326 | 1/1993 | European Pat. Off. |
|---|---|---|
| 89123124 | 1/1993 | European Pat. Off. |
| 0536925 | 4/1993 | European Pat. Off. |
| 0585709 | 3/1994 | European Pat. Off. |
| 2195656 | 8/1990 | Japan. |
| 3095865 | 4/1991 | Japan. |
| 4012468 | 1/1992 | Japan. |

*Primary Examiner*—Prince Willis, Jr.
*Assistant Examiner*—M. Nuzzolillo
*Attorney, Agent, or Firm*—Gifford, Krass, Groh, Sprinkle, Patmore, Anderson & Citkowski

[57] ABSTRACT

A fuel cell includes an electrolyte layer in form of a plate, an oxygen electrode formed on one surface of the electrolyte layer, a fuel electrode formed on the other surface of the electrolyte layer, and a conductive separator opposed to the oxygen electrode or fuel electrode for defining oxygen-containing gas passages or fuel gas passages. The separator includes a plate-like portion opposed to and spaced from the oxygen electrode or fuel electrode, a pair of strip-shaped projections extending along opposite ends of the plate-like portion for contacting opposite edges of the electrolyte layer, and a plurality of ridges for defining gas passages in form of grooves between the pair of strip-shaped projections. A fuel cell system includes a plurality of such fuel cells stacked one over another in a spaced relationship to define fuel gas passages or oxygen-containing gas passages in between. A flexible conductive element is disposed between an adjacent pair of the fuel cells.

4 Claims, 7 Drawing Sheets

FUEL CELL SYSTEM AND FUEL CELLS THEREFOR

BACKGROUND OF THE INVENTION

1. Field of the Invention

The present invention relates to fuel cells and a fuel cell system. More particularly, the invention relates to fuel cells each including an electrolyte layer in the form of a plate, an oxygen electrode applied to one surface of the electrolyte layer, a fuel electrode applied to the other surface of the electrolyte layer, and a gas passage defining device formed of a conductive material and opposed to the oxygen electrode or fuel electrode for defining oxygen-containing gas passages or fuel gas passages; and to a fuel cell system using such cells.

2. Description of the Related Art

Figure 11:
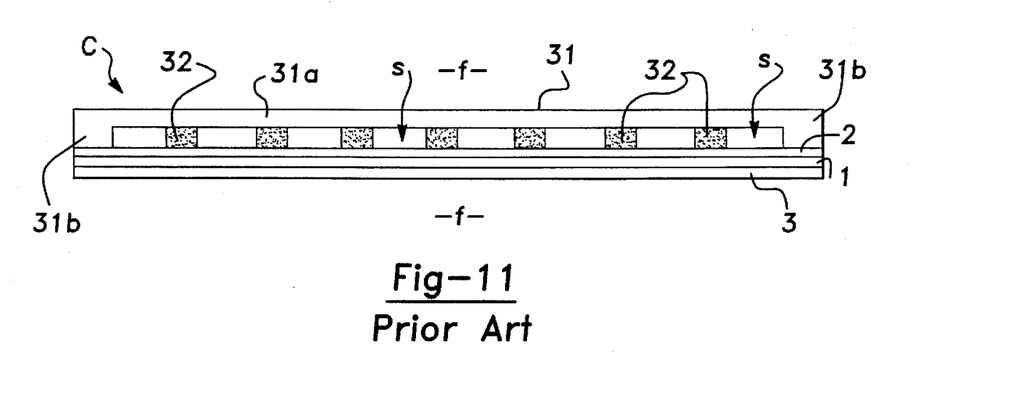
FIG. 11 is a front view of a conventional fuel cell.

FIG. 11 shows a cell C of this type known in the art.

This cell C includes a separator 31 formed of a conductive material and having a plate portion 31a and a pair of strip-shaped projections 31b extending along opposite ends of the plate portion 31a. The separator 31 is attached to an oxygen electrode 2 (or fuel electrode 3), with the strip-shaped projections 31b contacting opposite edges thereof, respectively. A plurality of conductive columnar members 32 are arranged between the separator 31 and oxygen electrode 2 (or fuel electrode 3). Thus, the separator 31 and oxygen electrode 2 (or fuel electrode 3) are connected in conductive state to each other, with a plurality of groove-like oxygen-containing gas passages "s" (or fuel gas passages "f") formed between the pair of strip-shaped projections 31b.

That is, a gas passage defining device R is formed of the separator 31 and the plurality of columnar members 32 formed separately from the separator 31.

A fuel cell system is composed of a plurality of such cells C stacked one over another in a spaced relationship to define fuel gas passages "f" (or oxygen-containing gas passages "s".

However, the conventional fuel cells involve a high manufacturing cost since the separator and columnar members must be manufactured separately. Furthermore, the cell manufacturing process is complicated by the necessity to arrange the plurality of columnar members between the separator and oxygen electrode (or fuel electrode) in addition to a step of attaching the separator to the oxygen electrode (or fuel electrode).

Moreover, since the oxygen electrode and fuel electrode are formed porous to be permeable to gases, it is necessary to seal positions of contact between the strip-shaped projections and oxygen electrode (or fuel electrode) to prevent gas leakage. This further complicates the cell manufacturing process.

The fuel cell system constructed of such fuel cells having the above drawbacks requires a high manufacturing cost as well as a complicated manufacturing process.

SUMMARY OF THE INVENTION

The present invention has been made having regard to the state of the art noted above, and its object is to provide fuel cells and a fuel cell system which may be manufactured at reduced cost and by a simplified process.

The above object is fulfilled, according to the present invention, by a fuel cell in which the gas passage defining device includes a plate-like portion opposed to and spaced from an oxygen electrode or fuel electrode, a pair of strip-shaped projections extending along opposite ends of the plate-like portion for contacting opposite edges of the electrolyte layer, and a plurality of ridges for defining gas passages in form of grooves between the pair of strip-shaped projections.

According to this construction, the gas passage defining device is opposed to the oxygen electrode or fuel electrode, with the pair of strip-shaped projections contacting the opposite edges of the electrolyte layer, respectively. The gas passage defining device is thus electrically connected to the oxygen electrode or fuel electrode, while defining a plurality of gas passages between the strip-shaped projections. Since the electrolyte layer is in the form of a plate impermeable to gases, gas leakage may be prevented without a special sealing treatment provided in positions of contact between the strip-shaped projections and electrolyte layer.

The fuel cell according to the present invention may be manufactured at low cost since the gas passage defining device having the plate-like portion, the pair of strip-shaped projections and ridges is prepared simply by forming a plurality of grooves in a plate material, for example. The gas passage defining device may simply be placed opposite the oxygen electrode or fuel electrode. This, combined with a sealing treatment no longer required to prevent gas leakage, as required in the prior art, simplifies the cell manufacturing process.

In a further aspect of the invention, a fuel cell system includes a plurality of such fuel cells stacked one over another in a spaced relationship to define fuel gas passages or oxygen-containing gas passages in between, and flexible conductive elements each disposed between an adjacent pair of the fuel cells.

According to this construction, a plurality of cells are electrically connected in series through the flexible conductive elements disposed between adjacent fuel cells to form a fuel cell system. Even when the cells become curved as a result of a temperature increase occurring during an operation of the fuel cell system, the flexible conductive elements absorb such curvature and suppress thermal stress. These flexible conductive elements reliably maintain adjacent cells in the conductive condition.

Consequently, the fuel cell system may be manufactured at low cost and by a simplified process. This fuel cell system has improved durability, with the curvature of the cells absorbed and thermal stress suppressed. Further, the feature that adjacent cells are reliably maintained in the conductive state realizes reduced internal resistance to promote performance of the fuel cell system.

Further and other objects, features and effects of the invention will become apparent from the following more detailed description of the embodiments of the invention taken with reference to the accompanying drawings.

DETAILED DESCRIPTION OF THE PREFERRED EMBODIMENTS

Fuel cells and a fuel cell system according to the present invention will be described in detail with reference to the drawings.

Figure 1:
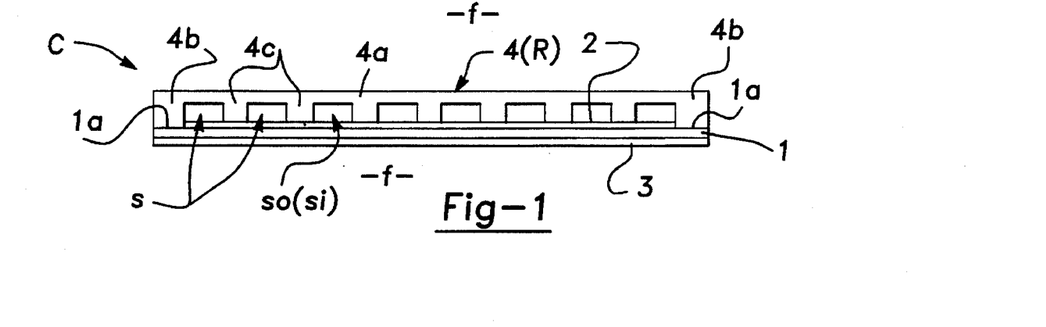
FIG. 1 is a front view of a fuel cell according to the present invention.
Figure 2:
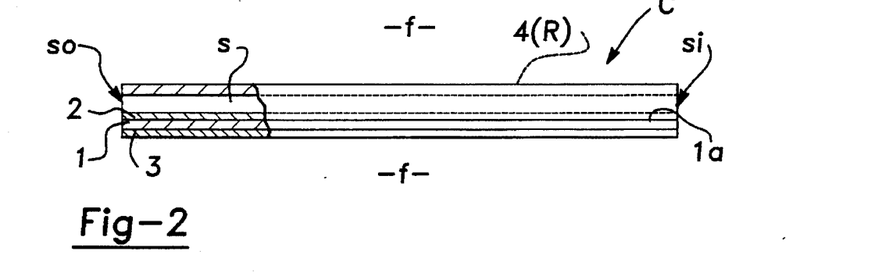
FIG. 2 is a side view, partly broken away, of the fuel cell shown in FIG. 1.
Figure 3:
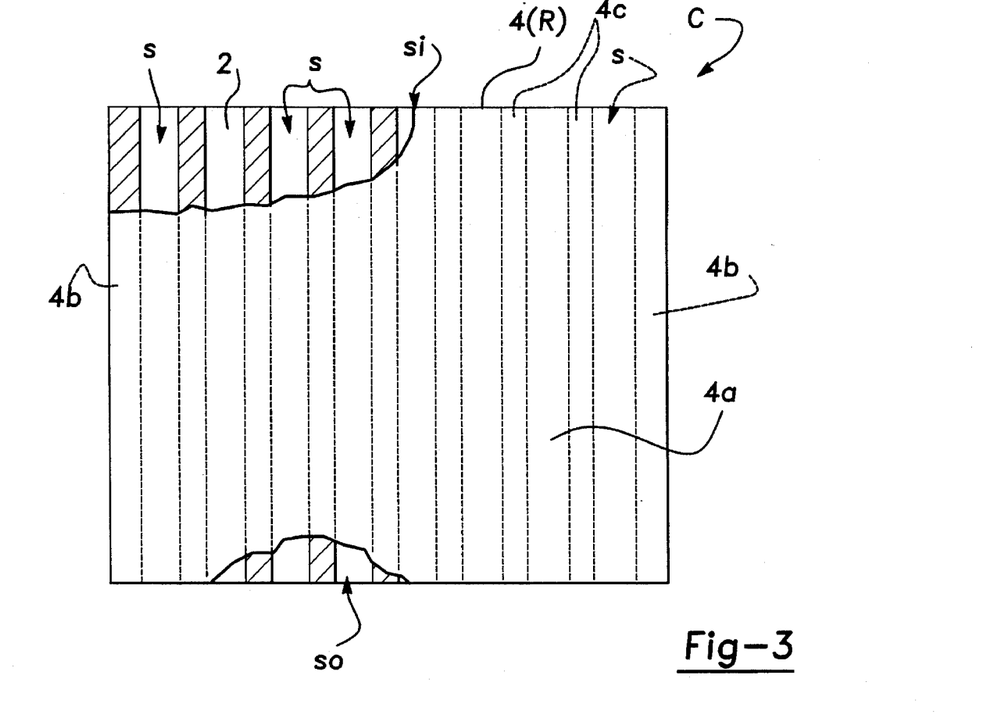
FIG. 3 is a plan view, partly broken away, of the fuel cell shown in FIG. 1.

First, the fuel cells C will be described referring to FIGS. 1 through 3. Each cell C has an electrolyte layer 1 in the form of a rectangular plate, and an oxygen electrode 2 in the form of a layer or plate applied to one surface of the electrolyte layer 1. The electrolyte layer 1 includes an electrolyte exposing portion 1a extending along an entire length of each of two opposite edges thereof. A fuel electrode 3 also in the form of a layer or plate is applied to the other surface of the electrolyte layer 1 to extend substantially over an entire area thereof. Thus, the cell C has a three-layer plate structure of rectangular shape, to derive an electromotive force from the oxygen electrode 2 and fuel electrode 3.

The solid-electrolyte layer 1 is formed of tetragonal zirconia ($ZrO_2$) which is a solid solution of Yt (yttria) in about 3 mol %, or other appropriate material. The oxygen electrode 2 is formed of lanthanum-manganese oxide ($LaMnO_3$) or other appropriate material. The fuel electrode 3 is formed of a cement of nickel (Ni) and zirconia ($ZrO_2$) or other appropriate material.

A conductive separator 4 includes a plate-like portion 4a, a pair of strip-shaped projections 4b extending along opposite edges of the plate-like portion 4a, and a plurality of ridges 4c arranged between the strip-shaped projections 4b, all formed integral with one another. The separator 4 is attached to the oxygen electrode 2, with the pair of strip-shaped projections 4b bonded to the electrolyte exposing portions 1a, respectively. The plate-like portion 4a is opposed to and spaced from the oxygen electrode 2, with the ridges 4c contacting the oxygen electrode 2.

Thus, the oxygen electrode 2 and conductive separator 4 are connected to each other in conductive state to define a plurality of oxygen-containing gas passages "s" between the pair of strip-shaped projections 4b. Peripheral regions of the conductive separator 4 and three-layer plate structure, as seen in a direction of flow through the oxygen-containing gas passages "s", provide fuel gas passages "f" partitioned from the oxygen-containing gas passages "s". Openings in one side of the conductive separator 4 and three-layer plate structure act as oxygen-containing gas inlets "si", while openings in the other side act as oxygen-containing gas outlets "so".

Thus, the conductive separator 4 corresponds to a gas passage defining device R having conductivity and provided to define the oxygen-containing gas passages "s" opposed to the oxygen electrode 2 of the three-layer plate structure.

Besides defining the oxygen-containing gas passages "s", the conductive separator 4 acts as a cell terminal for deriving a current from the oxygen electrode 2. With the plurality of ridges 4c contacting the oxygen electrode 2, electric passages having a large sectional area are provided from the oxygen electrode 2 to the conductive separator 4 acting as cell terminal.

The separator 4 is formed of lanthanum-chromium oxide ($LaCrO_3$) or other conductive ceramic material that has excellent resistance to oxidation and reduction.

Figure 4:
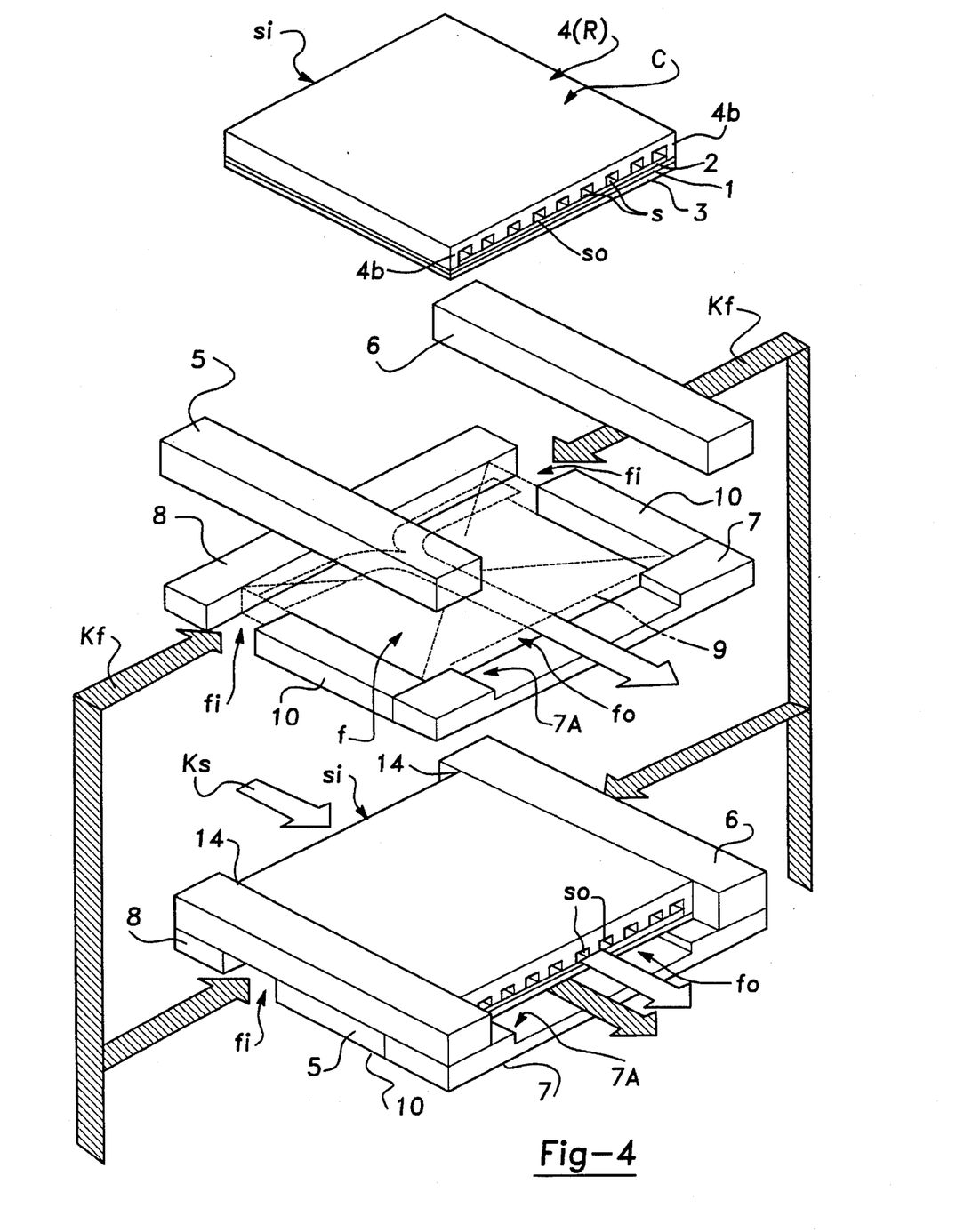
FIG. 4 is a perspective view showing a way in which a plurality of cells as shown in FIG. 1 are stacked.

A fuel cell system formed by assembling a plurality of fuel cells C having the above construction will be described next with reference to FIG. 4.

A first bar member 5 and a second bar member 6 having substantially the same thickness as and longer than each cell C are placed in tight contact with the opposite side surfaces of the cell C where the oxygen-containing gas passages "s" are closed by the conductive separator 4. A third bar member 7 and a fourth bar member 8 equal in thickness and longer than the cell C are placed in tight contact with the opposite edges of the cell C where the oxygen-containing gas passages "s" open. Opposite ends of the first bar member 5 and second bar member 6 are placed in tight contact with opposite ends of the third bar member 7 and fourth bar member 8. On this set of cell C and bar members a next set is stacked, then a further set, and so on repeatedly.

In this way, a plurality of fuel cells C are stacked with a space between an adjacent pair to form fuel gas passages "f" therein.

It is to be noted that a heat resisting and electrically insulating adhesive 14 is filled between the side surfaces of each cell C adjacent the oxygen-containing gas inlets "si" and the first and second bar members 5, 6, and between that edge of the cell C and the fourth bar member 8, to prevent the oxygen-containing gas from flowing to other locations than the oxygen-containing gas passages "s".

A flexible conductive element 9 is filled between an adjacent pair of cells C to allow passage of gases. Thus, an adjacent pair of cells C are electrically connected to each other through the flexible conductive element 9. The flexible conductive element 9 comprises a felt-like nickel material or other appropriate material having excellent resistance to heat and reduction.

The fuel gas passages "f" will particularly be described next.

Each of the third bar members 7 includes a recess 7A to define an opening with the fuel electrode 3 of the cell C. Inlet defining members 10 are arranged between an adjacent pair of first bar members 5 and between adjacent pair of second bar members 6, respectively, to define openings adjacent the oxygen-containing gas inlets "si". The openings defined by the inlet defining members 10 act as fuel gas inlets "fi", while the recesses 7A act as fuel gas outlets "fo".

Thus, the fuel gas passages "f" are arranged such that the fuel gas enters the fuel gas inlets "fi" at the opposite sides, and flows through the flexible conductive element 9 in curved conditions to the fuel gas outlet "fo".

Figure 5:
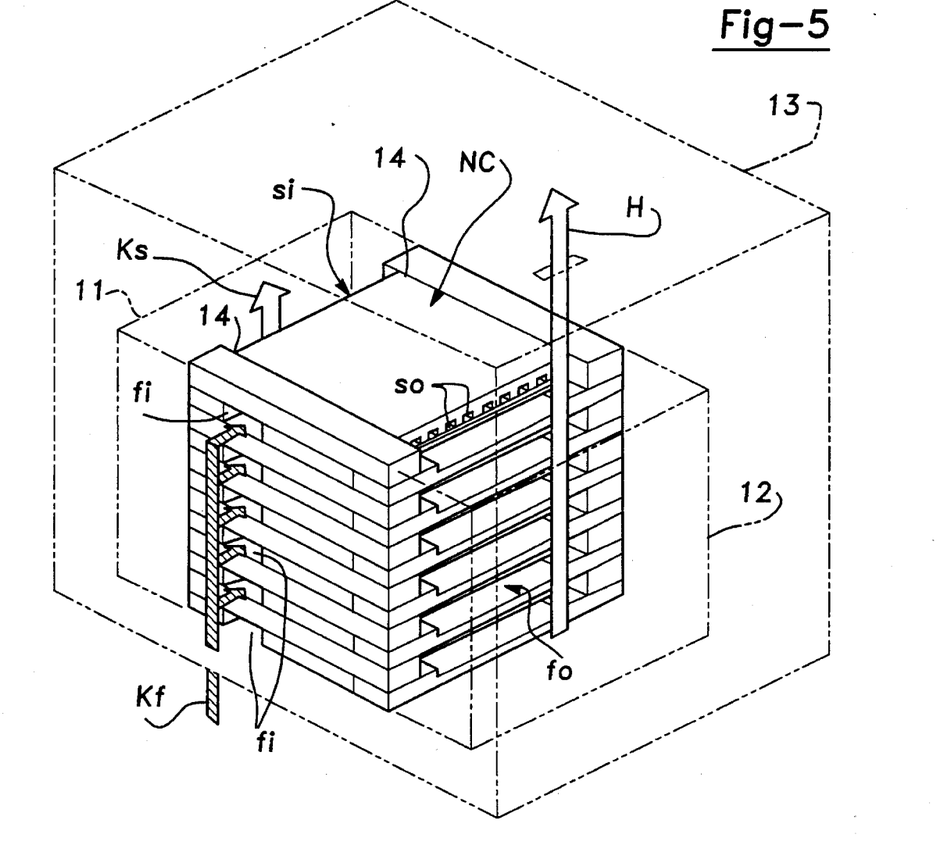
FIG. 5 is a perspective view of a fuel cell system having cells as shown in FIG. 1.

As shown in FIG. 5, a gas duct 11 is provided on one side of a cell assembly NC constructed as above, the gas duct 11 being gas-tight and communicating with the oxygen-containing gas inlets "si". A gas duct 12 is provided on the other side of the cell assembly NC, the gas duct 12 being gas-tight and communicating with the oxygen-containing gas outlets "so" and fuel gas outlets "fo". Thus, the gas duct 11 defines an oxygen-containing gas supply passage "Ks" extending therethrough and communicating with the oxygen-containing gas inlets "si", while the gas duct 12 defines an exhaust passage H extending therethrough and communicating with the oxygen-containing gas outlets "so" and fuel gas outlets "fo". The exhaust passage H acts also as a combustion chamber for combustion of exhaust oxygen-containing gas from the oxygen-containing gas outlets "so" and exhaust fuel gas from the fuel gas outlets "fo".

The cell assembly NC is mounted in a box 13. The fuel gas inlets "fi" of the cell assembly NC communicate with interiors of the box 13 acting as fuel gas supply passages "Kf".

Figure 6:
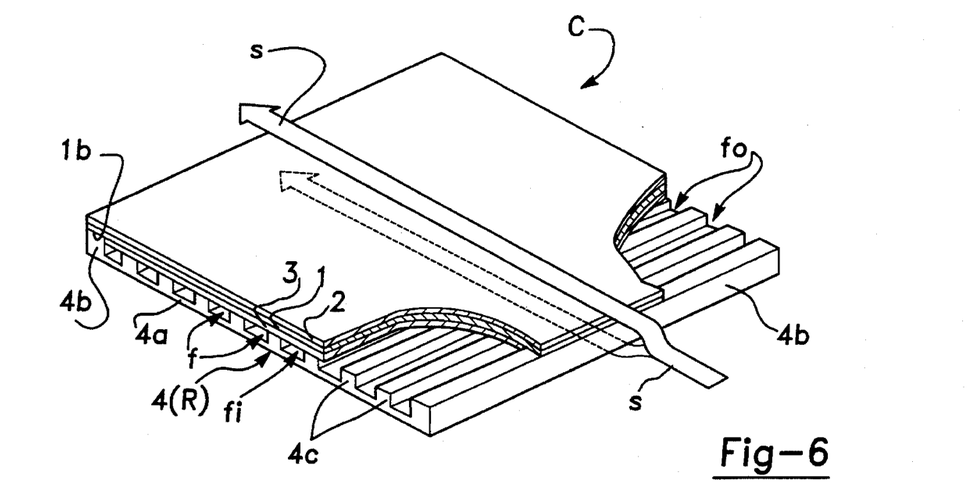
FIG. 6 is a perspective view, partly broken away, of a fuel cell in another embodiment of the invention.
Figure 7:
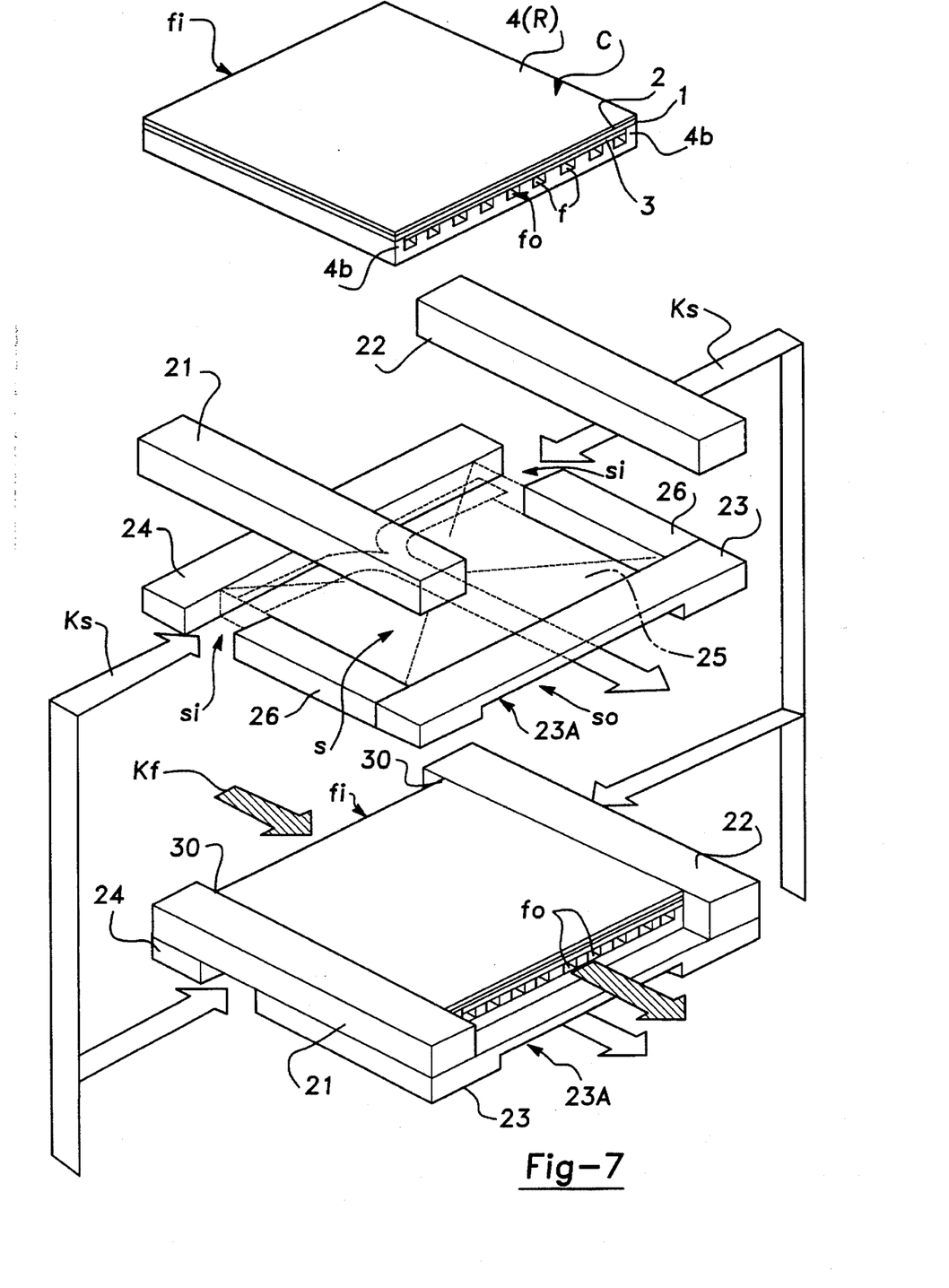
FIG. 7 is a perspective view showing a way in which a plurality of cells as shown in FIG. 6 are stacked.

Another embodiment of the invention will be described with reference to FIGS. 6 through 8.

First, fuel cells C will be described referring to FIG. 6. Each cell C has an electrolyte layer 1 in the form of a rectangular plate, and an oxygen electrode 2 in the form of a layer or plate applied to one surface of the electrolyte layer 1. A fuel electrode 3 also in the form of a layer or plate is applied to the other surface of the electrolyte layer 1 to extend substantially over an entire area thereof. On this other surface, the electrolyte layer 1 includes an electrolyte exposing portion 1b extending along an entire length of each of two opposite edges thereof. Thus, the cell C has a three-layer plate structure of rectangular shape, to derive an electromotive force from the oxygen electrode 2 and fuel electrode 3. A conductive separator 4 is attached to the fuel electrode 3, with a pair of strip-shaped projections 4b bonded to the electrolyte exposing portions 1a, respectively. The plate-like portion 4a is opposed to and spaced from the fuel electrode 3, with a plurality of ridges 4c contacting the fuel electrode 3.

Thus, the fuel electrode 3 and conductive separator 4 are connected to each other in conductive state to define a plurality of fuel gas passages "f" between the pair of strip-shaped projections 4b. Peripheral regions of the conductive separator 4 and three-layer plate structure, as seen in a direction of flow through the fuel gas passages "f", provide oxygen-containing gas passages "s" partitioned from the fuel gas passages "f". Openings in one side of the conductive separator 4 and three-layer plate structure act as fuel gas inlets "fi", while openings in the other side act as fuel gas outlets "fo".

Thus, the conductive separator 4 corresponds to a gas passage defining device R having conductivity and provided to define the fuel gas passages "s" opposed to the fuel electrode 3 of the three-layer plate structure.

A fuel cell system formed by assembling a plurality of fuel cells C having the above construction will be described next with reference to FIG. 7.

A first bar member 21 and a second bar member 22 having substantially the same thickness as and longer than each cell C are placed in tight contact with the opposite side surfaces of the cell C where the fuel gas passages "f" are closed by the conductive separator 4. A third bar member 23 and a fourth bar member 24 equal in thickness and longer than the cell C are placed in tight contact with the opposite edges of the cell C where the fuel gas passages "f" open. Opposite ends of the first bar member 21 and second bar member 22 are placed in tight contact with opposite ends of the third bar member 23 and fourth bar member 24. On this set of cell C and bar members a next set is stacked, then a further set, and so on repeatedly. In this way, a plurality of fuel cells C are stacked with a space between an adjacent pair to form oxygen-containing gas passages "s" therein.

It is to be noted that a heat resisting and electrically insulating adhesive 30 is filled between the side surfaces of each cell C adjacent the fuel gas inlets "fi" and the first and second bar members 21, 22, and between that edge of the cell C and the fourth bar member 24, to prevent the fuel gas from flowing to other locations than the fuel gas passages "f".

A flexible conductive element 25 is filled between an adjacent pair of cells C to allow passage of gases. Thus, an adjacent pair of cells C are electrically connected to each other through the flexible conductive element 25.

The flexible conductive element 25 comprises a felt-like lanthanum-manganese oxide or other appropriate material having excellent resistance to heat and reduction.

The oxygen-containing gas passages "s" will particularly be described next.

Each of the third bar members 23 includes a recess 23A to define an oxygen-containing gas outlet "so". Inlet defining members 26 are arranged between an adjacent pair of first bar members 21 and between adjacent pair of second bar members 22, respectively, to define oxygen-containing gas inlets "si".

Figure 8:
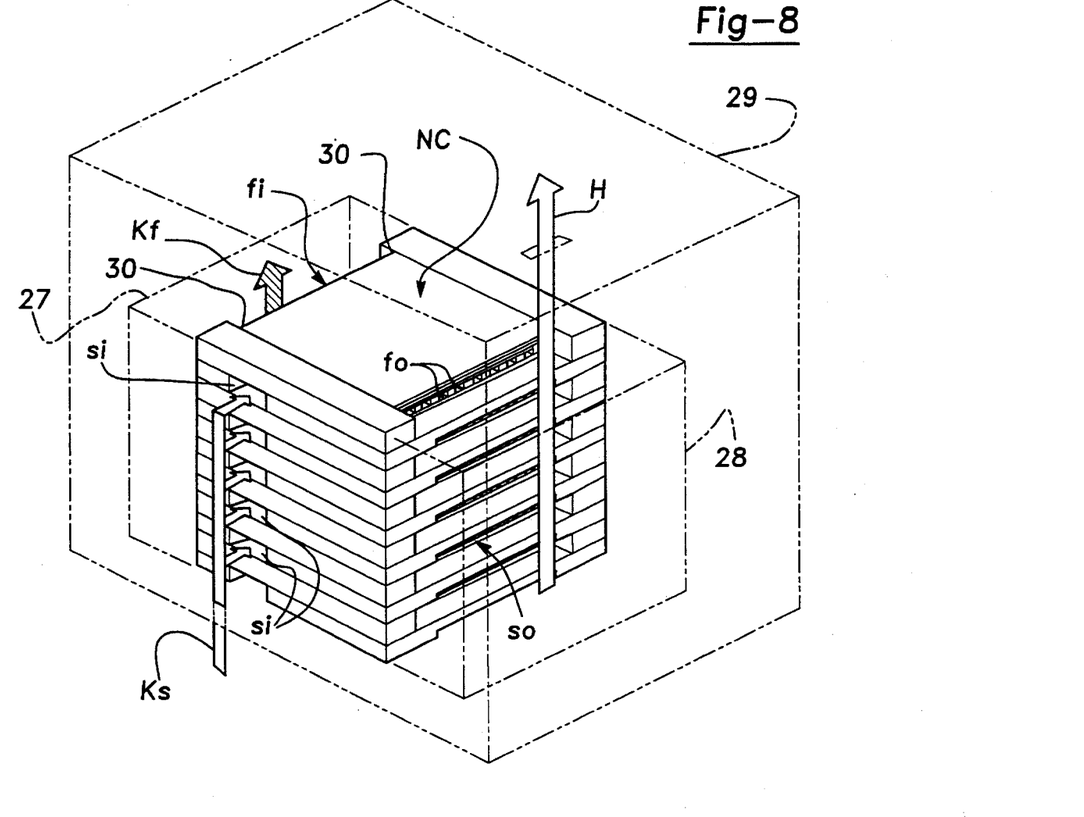
FIG. 8 is a perspective view of a fuel cell system having cells as shown in FIG. 6.

As shown in FIG. 8, a gas duct 27 is provided on one side of a cell assembly NC constructed as above, the gas duct 27 being gas-tight and communicating with the fuel gas inlets "fi". A gas duct 28 is provided on the other side of the cell assembly NC, the gas duct 28 being gas-tight and communicating with the oxygen-containing gas outlets "so" and fuel gas outlets "fo". Thus, the gas duct 27 defines a fuel gas supply passage "Kf" extending therethrough and communicating with the fuel gas inlets "fi", while the gas duct 28 defines an exhaust passage H extending therethrough and communicating with the oxygen-containing gas outlets "so" and fuel gas outlets "fo".

The cell assembly NC is mounted in a box 29. The oxygen-containing gas inlets "si" of the cell assembly NC communicate with interiors of the box 29 acting as oxygen-containing gas passages "Ks".

Fuel cell systems in a further embodiment of the invention will be described hereinafter.

In the foregoing embodiments, the fuel gas passages "f" (or oxygen-containing gas passages "s") are arranged such that the fuel gas (or oxygen-containing gas) enters the fuel gas inlets "fi" (or oxygen-containing gas inlets "si") at the opposite sides, and flows through the flexible conductive element 9 in curved conditions to the fuel gas outlet "fo" (or oxygen-containing gas outlet "so"). Alternatively, the fuel gas passages "f" (or oxygen-containing gas passages "s") may be arranged such that the fuel gas or oxygen-containing gas enters fuel gas inlets "fi" or oxygen-containing gas inlets "si" at one side and flows straight through the flexible conductive element 9 to the fuel gas outlet "fo" or oxygen-containing gas outlet "so" at the other side.

Figure 9:
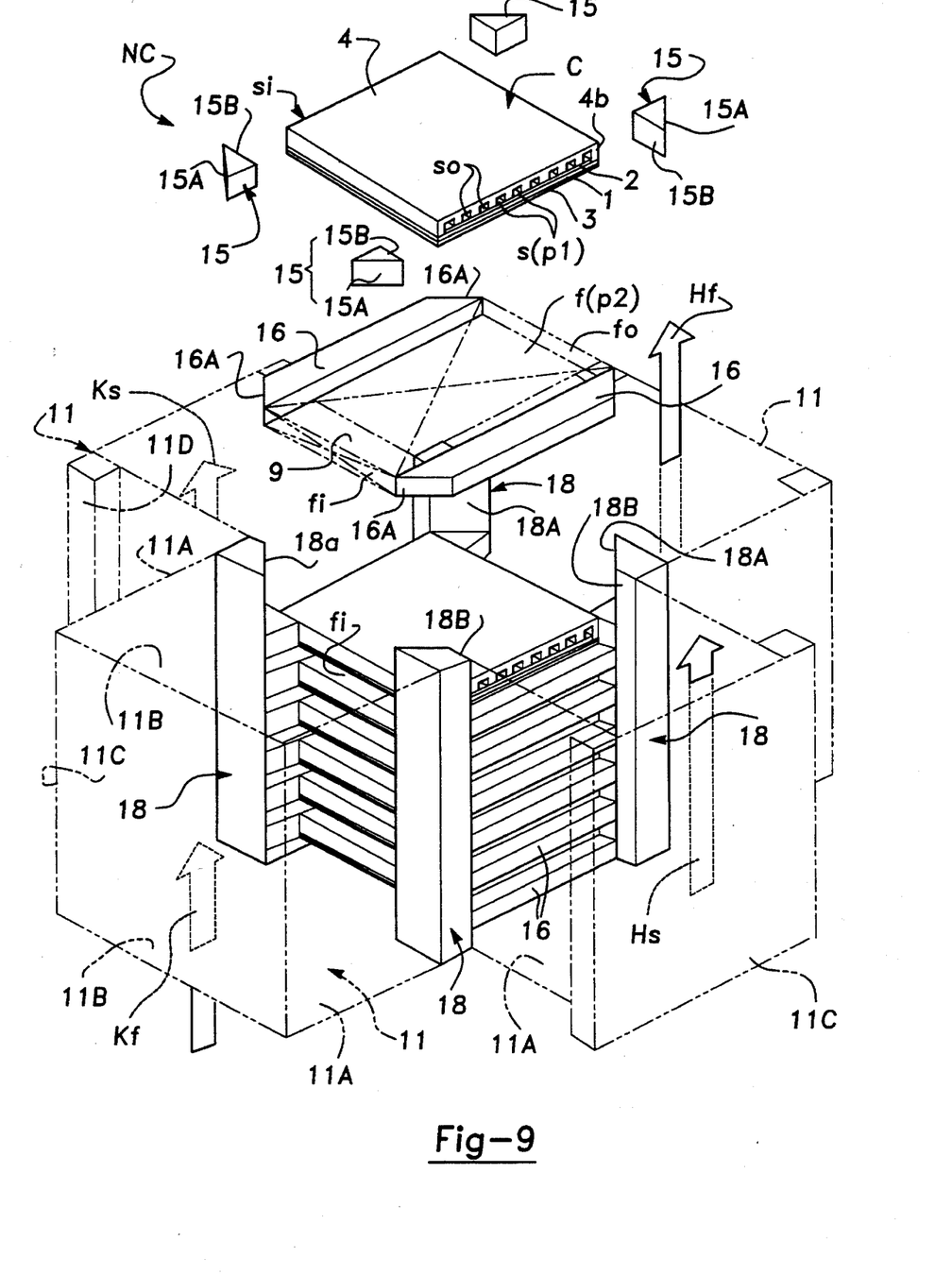
FIG. 9 is an exploded perspective view of a fuel cell system in a further embodiment of the invention.

FIG. 9 shows one example of such fuel cell systems.

Reference "NC" denotes a cell assembly including a plurality of cells C in the form of rectangular plates stacked one over another in a spaced relationship to define fuel gas passages "f" in between.

This embodiment employs a pair of elongated partition members 16 in the form of square bars and four spacers 15 for each cell C. Each of the partition members 16 has opposite end surfaces 16A inclined at approximately 45 degrees to an outer surface thereof as seen in a stacking direction of the cell assembly NC. Each spacer 15 is in the shape of a triangular prism which approximately has the shape of an isosceles triangle as seen in the stacking direction of the cell assembly NC, with an angle of about 45 degrees formed at the opposite ends of the oblique side. The spacer 15 includes a first tight contact surface 15A corresponding to the oblique side, and second tight contact surfaces 15B corresponding to the remaining sides of the triangle. The spacer 15 has substantially the same thickness as one cell C.

Each cell C is placed on one pair of partition members 16 extending parallel to each other. In this state, the sides of the cell C defining openings of intracellular passages p1 lie above the pair of partition members 16. Then, each of the four spacers 15 is placed at an end of a side of the cell C not having the openings of the intracellular passages p1 and adjacent the openings of the intracellular passages p1. That is, the four spacers 15 are placed in contact with the sides of the cell C not having the openings of the intracellular passages p1 so as to hold the cell C in place, and on the pair of partition members 16 already arranged in place.

A column 18 is erected along each of the four corners of the cell assembly NC. Each column 18 has a trapezoidal cross section, with one side extending perpendicular to the two parallel sides, and the remaining side extending at approximately 45 degrees to the longer of the two parallel sides. The above-mentioned remaining side defines a contact surface 18A extending longitudinally of the column 18. The contact surface 18A, as seen in the stacking direction of the cell assembly NC, crosses two sides continuous with the corner of the cell assembly NC opposed to the contact surface 18A.

When the cell assembly NC has been formed, the contact surface 18A of each column 18 is in tight contact with the end surfaces 16A of the partition members 16 and with the first tight contact surfaces 15A of the spacers 15. Further, the second tight contact surfaces 15B of the spacers 15 are in tight contact with the sides of the cells C not having the openings of the intracellular passages p1.

FIGS. 10(a) through (e) show a specific sequence of constructing the cell assembly NC shown in FIG. 9.

Figure 10A:
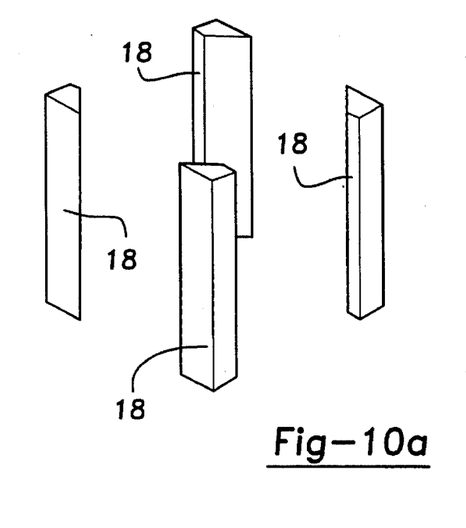
FIGS. 10(a) through (E) are views showing a sequence of forming the fuel cell system of FIG. 9.

The four columns 18 are first placed in positions corresponding to the four corners of the cell assembly NC. At this time, each contact surface 18A is placed so as to extend at approximately 45 degrees to each of the two sides continuous with the corner opposed to the contact surface 18A.

Figure 10B:
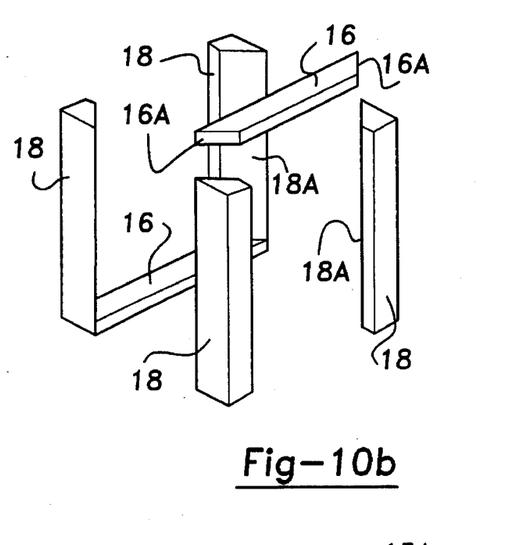

Next, each of the partition members 16 is moved in a direction outwardly of the cell assembly NC and substantially perpendicular to the stacking direction, to press the opposite end surfaces 16A thereof against the contact surfaces 18A of two of the columns 18. In this way, the partition members 16 are arranged in a substantially parallel pair.

Figure 10C:
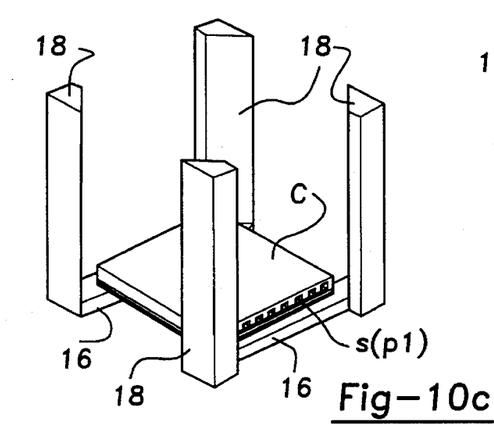

Then, one cell C is placed so that the sides thereof defining the openings of the intracellular passages p1 rest tight on the partition members 16, respectively. Four gaps are formed between the contact surfaces 18A of the columns 18 and the sides of the cell C not defining the openings of the intracellular passages p1. The spacers 15 are arranged in these spaces. At this time, each spacer 15 has a bottom surface in tight contact with an upper surface of an end region of one of the partition members 16. The first tight contact surface 15A of each spacer 15 is in tight contact with the contact surface 18A of one of the columns 18. One of the second tight contact surfaces 15B of each spacer 15 is in tight contact with one side of the cell C.

Figure 10D:
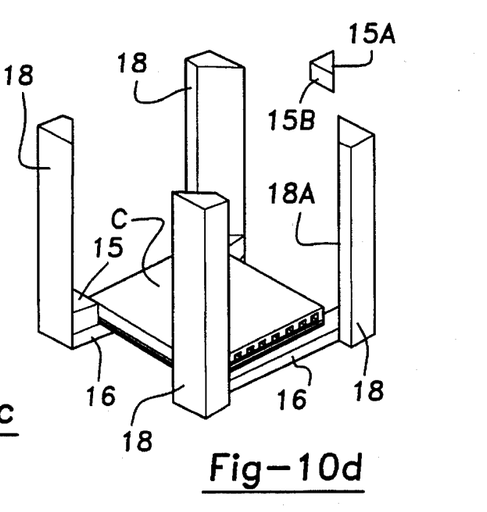
Figure 10E:
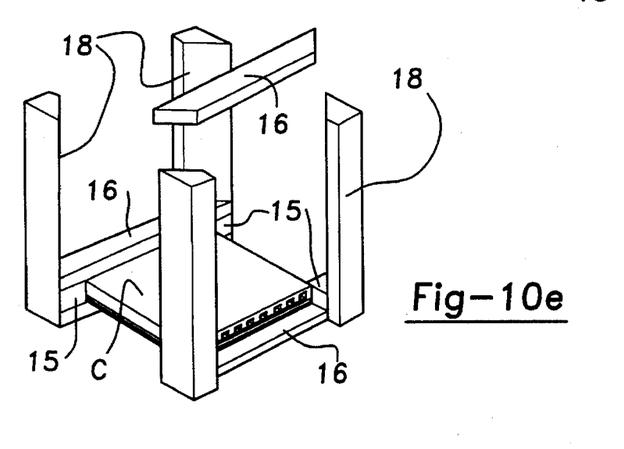

A next pair of partition members 16 is placed on the cell C and spacers 15 already placed in position. This pair of partition members 16 is placed so that the sides of the cell C having the openings of the intracellular passages p1 are in tight contact with lower surfaces of the partition members 16. A further cell C and further four spacers 15 are placed on the new pair of partition members 16. These steps are repeated to stack a plurality of cells C one over another, thereby forming the cell assembly NC.

The partition members 16 and spacers 15 are formed of an insulating and heat resistant material such as ceramic. An insulating and heat resistant adhesive may be used, as necessary, to provide gastight connections between the end surfaces 16A of the partition members 16 and the contact surfaces 18A of the columns 18, between the partition members 16 and the sides of the cells C, between the partition members 16 and spacers 15, between the first tight contact surfaces 15A and the contact surfaces 18A of the columns 18 and between the second tight contact surfaces 15B and the sides of the cells C.

In the above construction, an intercellular passage p2 is formed between a vertically adjacent pair of cells C, which is partitioned from the intracellular passages p1. That is, the intercellular passage p2 has opposite sides defined by the partition members 16, and a top and bottom defined by the two adjacent cells C. The intercellular passage p2 has an opening direction substantially perpendicular to the opening direction of the intracellular passages p1.

In this embodiment, the intracellular passages p1 act as oxygen-containing gas passages "s" for receiving an oxygen-containing gas, and the intercellular passages p2 act as fuel gas passages "f" for receiving a fuel gas. The opposite openings of the intracellular passages p1 act as oxygen-containing gas inlets "si" and oxygen-containing gas outlets "so". The opposite openings of the intercellular passages p2 act as fuel gas inlets "fi" and fuel gas outlets "fo".

Each intercellular passage p2 is filled with a fuel-side flexible conductive material 9. The flexible conductive material 9 comprises a felt-like nickel material or other appropriate material having excellent resistance to heat and reduction. This conductive material 9 allows passage of the fuel gas, and absorbs thermal distortions occurring in the direction of width of the cells C.

An oxygen-containing gas supply passage Ks and an oxygen-containing gas exhaust passage Hs are provided at the opposite sides of the cell assembly NC having the openings of the oxygen-containing gas passage "s". A fuel gas supply passage Kf and fuel gas exhaust passage Hf are provided at the opposite sides of the cell assembly NC having the openings of the fuel gas passages "f". These four gas supply passages Ks and Kf and gas exhaust passages Hs and Hf are defined by gas ducts 11 acting as gas passage defining members.

Each of the gas ducts 11 has a box-like configuration including right and left side walls 11A, upper and lower side walls 11B, a bottom wall 11C and columns 11D.

Each gas duct 11 is disposed to have an opening side thereof opposed to a side of the cell assembly NC, with the right and left side walls 11A connected to, in surface contact with, connecting surfaces 18B or 18C of the columns 18 disposed at opposite lateral ends of one side of the cell assembly NC. That is, the connecting surfaces 18B and 18C are formed planar to achieve tight contact with the gas ducts 11.

In the embodiment shown in FIGS. 9 and 10, the cell assembly includes a plurality of cells C in the form of rectangular plates stacked one over another in a spaced relationship to define fuel gas passages "f" in between. Alternatively, a plurality of cells C in the form of rectangular plates may be stacked one over the other in a spaced relationship to define oxygen-containing gas passages "s" in between. Then, the intracellular passages act as fuel gas passages "f", and the intercellular passages as oxygen-containing gas passages "s".

What is claimed is:

1. A fuel cell comprising:

an electrolyte layer in form of a square plate, said electrolyte layer including a pair of exposing portions formed along opposite edges of said electrolyte layer;

an oxygen electrode formed on one side of said electrolyte layer;

a fuel electrode formed on the other side of said electrolyte layer;

gas passage defining means for defining oxygen-containing gas passages opposed to said oxygen electrode;

said gas passage defining means includes a plate portion extending in parallel to said oxygen electrode, a pair of strip-shaped projections extending from a pair of opposite edges of said plate portion to be bonded to said exposing portions of said electrolyte layer, and a plurality of ridges for defining oxygen-containing gas passages in form of grooves between said pair of strip-shaped projections; and said pair of strip-shaped projections and said plurality of ridges are integrally formed with said plate portion.

2. A fuel cell as defined in claim 1, wherein said ridges are placed in contact with said fuel electrode to define a plurality of fuel gas passages in form of grooves.

3. A fuel cell system comprising a plurality of fuel cells, each of said fuel cells including:

an electrolyte layer in form of a plate;

an oxygen electrode formed on one surface of said electrolyte layer;

a fuel electrode formed on the other surface of said electrolyte layer; and gas passage defining means having conductivity and opposed to one of said oxygen electrode and said fuel electrode for defining oxygen-containing gas passages and fuel gas passages;

wherein said gas passage defining means includes a plate portion opposed to and spaced from one of said oxygen electrode and said fuel electrode, a pair of strip-shaped projections extending along opposite ends of said plate portion for contacting opposite edges of said electrolyte layer, and a plurality of ridges for defining gas passages in form of grooves between said pair of strip-shaped projections;

flexible conductive elements each disposed between an adjacent pair of said fuel cells, said fuel cells are stacked one over another in a spaced relationship to define fuel gas passages and oxygen-containing passages therebetween, each of said flexible conductive elements being a conductive separator;

a first bar member and a second bar member having the same thickness as and longer than each of said cells being placed in contact with opposite side surfaces of each of said cells where said oxygen-containing gas passages and said fuel gas passages are closed by said conductive separator;

a third bar member and a fourth bar member having the same thickness as and longer than each of said cells being placed in contact with opposite edges of each of said cells where said oxygen-containing gas passages and said fuel gas passages are open; and opposite ends of said first bar member and said second bar member being placed in contact with opposite ends of said third bar member and said fourth bar member, sets of the cell and bar members being stacked one over another in a spaced relationship to define fuel gas passages and oxygen-containing gas passages in between.

4. A fuel cell system as defined in claim 3, wherein said flexible conductive elements are formed of a felt material.

* * * * *